US007814029B1

(12) United States Patent
Siegel

(10) Patent No.: US 7,814,029 B1
(45) Date of Patent: Oct. 12, 2010

(54) METHOD AND SYSTEM FOR ESTIMATING CONSUMER SATISFACTION

(75) Inventor: Hilliard B. Siegel, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1334 days.

(21) Appl. No.: 11/038,453

(22) Filed: Jan. 18, 2005

(51) Int. Cl.
*G06Q 10/00* (2006.01)
*G06Q 30/00* (2006.01)

(52) U.S. Cl. .................................. 705/347; 705/1.1
(58) Field of Classification Search .................. 705/1
See application file for complete search history.

(56) References Cited

U.S. PATENT DOCUMENTS

| | | | | |
|---|---|---|---|---|
| 5,950,172 | A * | 9/1999 | Klingman | 705/26 |
| 6,115,691 | A * | 9/2000 | Ulwick | 705/7 |
| 6,807,518 | B1 * | 10/2004 | Lang | 703/2 |
| 7,065,494 | B1 * | 6/2006 | Evans | 705/10 |
| 7,080,064 | B2 * | 7/2006 | Sundaresan | 707/3 |
| 2002/0184082 | A1 * | 12/2002 | Nakano et al. | 705/10 |
| 2004/0068413 | A1 * | 4/2004 | Musgrove et al. | 705/1 |
| 2004/0111314 | A1 * | 6/2004 | Cavaretta | 705/10 |
| 2004/0220842 | A1 * | 11/2004 | Barney | 705/7 |
| 2006/0106670 | A1 * | 5/2006 | Cai et al. | 705/13 |

* cited by examiner

*Primary Examiner*—John G Weiss
*Assistant Examiner*—Candice D Carter
(74) *Attorney, Agent, or Firm*—Seed IP Law Group PLLC

(57) ABSTRACT

An index for an item in a computer implemented merchandising system is computed as a function of objective data, e.g., transaction data, and subjective data, e.g., customer satisfaction ratings or reviews. The index may be extended with other data, including revenue, returns, refunds, discontinuations, and interactive shopping data. The index may further be weighted using a variety of weight factors for different components of the subjective and objective data. A display of the index places customer satisfaction data in the context of transaction data. The index may be used to provide prospective customers with a more balanced picture of consumer satisfaction than can be provided from customer satisfaction data alone, including prospective purchase comparisons and desirability.

23 Claims, 11 Drawing Sheets

| SATISFACTION LEVEL | WEIGHT FACTOR |
|---|---|
| S1 | W1 |
| S2 | W2 |
| S3 | W3 |
| S4 | W4 |
| S5 | W5 |

*Fig. 7A.*

SATISFACTION LEVEL/WEIGHT FACTOR EXAMPLE

| SATISFACTION LEVEL | WEIGHT FACTOR |
|---|---|
| ☺ | -3 |
| ☺☺ | -1 |
| ☺☺☺ | 0 |
| ☺☺☺☺ | +1 |
| ☺☺☺☺☺ | +3 |

*Fig. 7B.*

METHOD AND SYSTEM FOR ESTIMATING CONSUMER SATISFACTION

FIELD OF THE INVENTION

The present invention is generally directed to systems and methods for consumer electronic commerce.

BACKGROUND OF THE INVENTION

The widespread availability of the Internet has presented new opportunities for Internet merchants to market and sell a variety of products and services to consumers Online. As with any purchase, consumers are unwilling to risk spending money on something that they may not fully enjoy or that may not otherwise meet their expectations. For products and services that are purchased online, but do not meet the expectations of the consumer, returning the product or stopping the service can be time-consuming. One way to mitigate the risk that a customer will be dissatisfied with a product or service is to display what other consumers have to say by encouraging them to rate the products and services, or write a review. This can help a prospective customer to decide whether the product or service is likely to meet his or her expectations.

SUMMARY OF THE INVENTION

The present invention provides a system, method, and computer-accessible medium to estimate consumer satisfaction using an index, the value of which is a function of data believed to indicate some level of consumer satisfaction, or lack thereof. The data may include subjective data representing a subjective indication of consumer satisfaction. The data further includes at least one item of objective transactional data representing an objective indication of consumer satisfaction.

In one aspect of the invention, the subjective and objective data are quantified to generate an index that places the subjective data in the context of the objective data. In this manner, the index facilitates presenting a prospective customer with a balanced estimate of consumer satisfaction that advantageously enables him or her to make a more informed decision than can be made from viewing consumer ratings and/or reviews alone.

In another aspect of the invention, the subjective data includes data representing reviews and/or ratings indicating consumer satisfaction with an item. The evaluations may include evaluations from consumers and/or evaluations prepared by third parties, including classifying the subjective data according to whether the data is unfavorable, indicating consumer dissatisfaction, or favorable, indicating consumer satisfaction.

In yet another aspect of the invention, the objective transactional data includes data that requires no active input from customers and, in accordance with the present invention, is presumed to be an objective indication of consumer satisfaction. The objective data includes transaction data representing transactions for products or services, referred to herein as items. The transaction data can include, but is not limited to, data representing gross or net revenue, sales, returns, refunds, leases, and rentals of an item. The transaction data may include data for items for which there is no subjective data available, e.g., items for which no rating or review was submitted, either favorable or unfavorable, or for which no evaluation has been made. Alternatively, or in addition, the data may include data that represents the volume and/or rate or rate of change of transactions for an item over a period of time, or by comparison to similar items.

In still another aspect of the invention, the index generated from the quantified subjective and objective data has a range of values from which consumer satisfaction may be inferred. One inference that may be drawn from index value at or near one extreme of the range is that consumers are highly satisfied with an item. Conversely, another inference that may be drawn from an index value at or near the other extreme of the range is that consumers are very dissatisfied with the item. Other inferences of satisfaction falling between highly satisfied and very dissatisfied may be drawn depending on the range of values of the index and where a particular value falls within that range.

In another aspect of the invention, each time prospective customers view information about an item online, the index, or a representation of the index, may be displayed proximate to the subjective data about the item, e.g., next to an average consumer rating or actual consumer review. Since the subjective and objective data changes over time, the method can dynamically regenerate the index using current data each time the prospective customer views information about the item. The dynamic nature of the index advantageously provides the prospective customer with a more up-to-date picture of consumer satisfaction than is provided by viewing the latest consumer rating and/or reviews alone.

In another aspect of the invention, the method compares the value of the index for a particular item to the value of the index of a competing item. Among other uses, the comparison may be advantageously used to rank items by the values of their respective indices.

In yet another aspect of the invention, the method generates an index for a category to which an item belongs, and compares the value of the index for the item to the value of the index for the category. In one example, the category comparison may include dividing the value of the index for the item by the value of the index for the category, resulting in a number that is greater than, less than, or equal to 1. When greater than 1, the comparison indicates that consumer satisfaction with the particular item is greater than consumer satisfaction with items in that category in general. When equal to 1, the comparison indicates that consumer satisfaction with the particular item is the same as consumer satisfaction with items in that category in general. When less than 1, the comparison indicates that consumer satisfaction with the particular item is less than consumer satisfaction with items in the category in general. Among other uses, the comparison may be advantageously used to provide the prospective customer with information indicating that he or she may be more satisfied with a different model or make of an item in a particular category. Similar to the comparison of indices of competing items, the category comparison may also be used to rank items within the category.

In still another aspect of the invention, the method tracks the direction and rate of change of an index for a particular item to determine whether consumers are becoming more or less satisfied with an item over time. Among other uses, the direction and rate of change of the index may be used to identify those items that are highly desirable, i.e., those items whose indices are rising quickly, perhaps due to high transaction volume and low returns, and/or significant numbers of good ratings and/or reviews. Alternatively, or in addition, the direction and rate of change of the index may be used to identify those items that are apparently no longer desirable. Items may cease to be desirable for a number of reasons, as may be reflected in an index that is falling due to, for example, a high number of returns, bad reviews, service discontinuations, or a plummeting transaction volume and/or declining transaction rate.

In yet another aspect of the invention, all or selected portions of the subjective and/or objective data may be given more or less weight, using a weight factor, the value of which depends on a number of considerations. Among others, the considerations may include the type of data, e.g., data representing consumer satisfaction as opposed to data representing consumer dissatisfaction, the volume of data, e.g., the volume of transactions or the volume of reviews, the rate of data, e.g., the rate of review and/or rating submission, the type of item, the sales channel, and/or the merchant. As one example, subjective data may be given more or less weight using a weight factor whose value corresponds to the scale that the consumer used to rate and/or review the item (e.g., 1 for 1 star rating, 2 for 2 stars, etc.). Subjective data representing moderate ratings and/or reviews are generally given less weight than subjective data representing ratings and reviews toward or at the ends of the scale. As another example, the objective data representing items that were returned will typically carry more weight than objective data representing items for which refunds were made.

In still another aspect of the invention, the method further extends the index to include interactive shopping data associated with the item. The interactive shopping data includes data that may be captured during a prospective customer's interaction with a Web page in which information about the item is displayed, such as the number of clicks, whether the information was copied or otherwise saved, the length of time the Web page was displayed, and so forth. Generally, the more interaction that a prospective customer has with the Web page in which information about the item is displayed, the greater the interest in, and, potentially, the greater the satisfaction with, the item. As with subjective data that represents ratings and/or reviews of an item, the weight given to the interactive shopping data may vary depending on a number of considerations already mentioned, including the volume and rate of transactions for the item over a period of time, the type of item, the sales channel, and/or the merchant. The weight given to the interactive shopping data may also depend on fraud considerations in the online merchant context, such as whether a high number of clicks were received from a suspicious IP address.

In one other aspect of the invention, the method estimates consumer satisfaction using an index for each feature of an item, especially when the ratings and reviews having the subjective data are broken down by feature.

In still another aspect of the invention, the value of the index may be subtracted from 1 to facilitate, among other uses, presentation and manipulation of the index for purposes of ranking, and other comparisons of the value of the index for one item to another item or to a category.

In yet another aspect of the invention, the method may modify the index using a security factor chosen to prevent or deter competitors from extrapolating sensitive transaction data used to compute the index, such as the total volume of sales, refunds, discontinuations and/or returns of a particular item.

In accordance with yet other aspects of the present invention, a computer-accessible medium for estimating consumer satisfaction using an index is provided. The computer-accessible medium has encoded data structures and computer executable components including an inferred satisfaction system. The data structures define the subjective and objective data having the index and the weight factors in a manner that is generally consistent with the above-described method.

Likewise, the computer executable components are capable of performing the actions of an inferred satisfaction system generally consistent with the above-described method.

BRIEF DESCRIPTION OF THE DRAWINGS

The foregoing aspects and many of the attendant advantages of the invention will become more readily appreciated as the same become better understood by reference to the following detailed description, when taken in conjunction with the accompanying drawings, wherein:

FIG. 7A is a chart that illustrates consumer satisfaction levels and associated weight factors used in implementing the embodiment shown in FIGS. 4-6B;

FIG. 7B is a chart that illustrates example values for consumer satisfaction levels and associated weight factors used in implementing the embodiment shown in FIGS. 4-6B.

DETAILED DESCRIPTION

Figure 1:
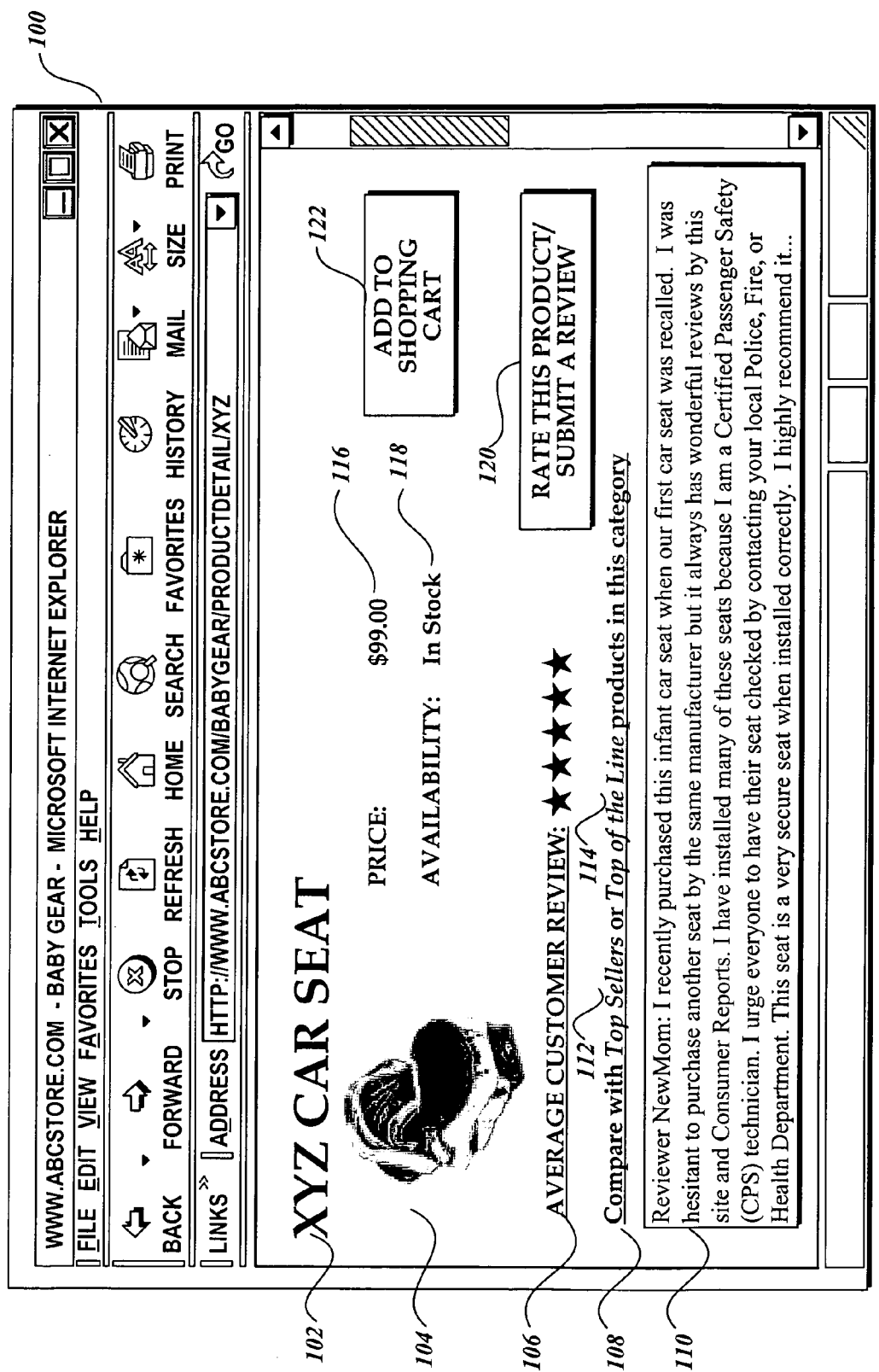
FIGS. 1-2 depict a browser program with exemplary Web pages presenting information about an item, including customer reviews as might be displayed in an online merchant's Web page.

With reference to FIG. 1, some online merchants encourage consumers to rate items and author online reviews, and display the ratings and/or reviews to other prospective customers. In the example, a browser program displays a Web page 100 in which the online merchant, "ABCSTORE" has listed details about an item, an infant car seat, available for purchase online as part of their baby gear item offerings. The item details include the name of the item, here "XYZ CAR SEAT," at reference numeral 102, a picture of the item at reference numeral 104, the price of the item, "$99.00," at reference numeral 116, and the availability of the item, "In Stock," at reference numeral 118. The Web page includes a command button labeled "ADD TO SHOPPING CART" at reference numeral 122 which the consumer may activate using a pointing device, keyboard, or other input device to initiate a transaction for the item.

To facilitate comparison shopping, the Web page may include hyperlinked text to item comparison information as shown at reference numeral 108 in the text "Compare with Top Sellers or Top of the Line products in the category." The illustrated Web page further includes a display of an overall customer rating of the item, here labeled "AVERAGE CUSTOMER REVIEW:" at reference numeral 106. As shown, the overall customer rating is displayed as one or more stars, smiley faces, or other icons that indicate a particular satisfaction level with the item on a particular scale of satisfaction, e.g., one icon if unsatisfied, two icons if partly satisfied, three icons if satisfied, four icons if very satisfied, and five icons, as shown in FIG. 1, if extremely satisfied, and so forth.

To obtain the overall customer rating, the Web page further includes a command button labeled "RATE THIS PRODUCT/WRITE A REVIEW," at reference numeral 120. In a typical scenario, the consumer activates the command button 120 to submit a rating and/or a written review. The written review (or reviews) then appears at the bottom of the Web page in a scrollable area at reference numeral 110, whenever subsequent consumers view the Web page. In the illustrated example, the written review is by a reviewer pen-named "NewMom," who writes:

> I recently purchased this infant car seat when our first car seat was recalled. I was hesitant to purchase another seat by the same manufacturer but it always has wonderful reviews by this site and Consumer Reports. I have installed many of these seats because I am a Certified Passenger Safety (CPS) technician. I urge everyone to have their seat checked by contacting your local Police, Fire, or Health Department. This seat is a very secure seat when installed correctly. I highly recommend it . . . .

While the availability of consumer ratings and reviews is generally helpful to prospective purchasers of items from online merchants, the present invention recognizes that consumer ratings and reviews tend to be disproportionately unfavorable. This is true even when other objective data, such as a high transaction volume and low return or refund rate, would appear to suggest that consumers are, in fact, highly satisfied with an item. This situation is demonstrated in the following example illustrated in FIG. 2, in which a browser program 200 displays a Web page in which the online, merchant, "ABCSTORE" has listed details about an item, an MP3 player, available for purchase online as part of their consumer electronic product offerings. As in the example described in FIG. 1, the item details listed in the Web page include the name of the item, "XYZ MP3 PLAYER" at reference numeral 202, a picture of the item at reference numeral 204, the price of the item, "$99.00" at reference numeral 216, and the availability of the item, "In Stock," at reference numeral 218. The Web page includes a command button labeled "ADD TO SHOPPING CART" at reference numeral 222, which the consumer may activate to initiate a transaction, as well as hyperlinked text at reference numeral 208 to comparison information for other items in the same category.

Figure 2:
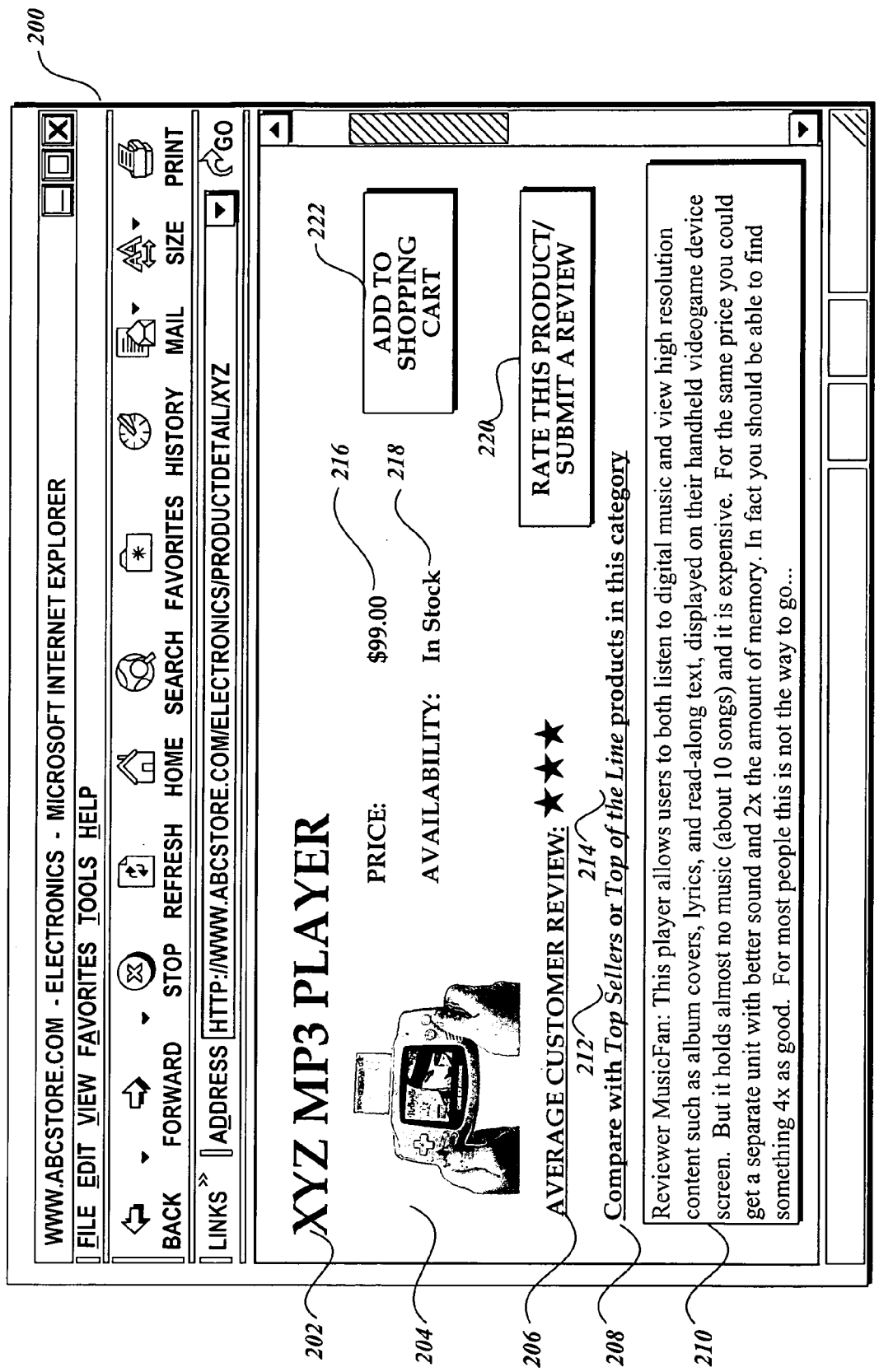

For purposes of illustration, suppose that the "XYZ MP3 PLAYER" product has a very high transaction volume, which would indicate that it is very satisfactory to a great deal of consumers. For example, it may well be that it is the only player on the market that allows users to both listen to digital music and view high resolution content, such as album covers, lyrics, and read-along text, displayed on their handheld videogame device screen. Nevertheless, as shown in FIG. 2, the overall customer rating at reference numeral 206 appears as only three icons, indicating that consumers are, on average, only partly satisfied with the "XYZ MP3 PLAYER." As shown at reference numeral 210, one of the written reviews is by a reviewer pen-named "MusicFan," who writes:

> This player allows users to both listen to digital music and view high resolution content such as album covers, lyrics, and read-along text, displayed on their handheld videogame device screen. But it holds almost no music (about 10 songs) and it is expensive. For the same price you could get a separate unit with better sound and 2× the amount of memory. In fact you should be able to find something 4× as good. For most people this is not the way to go . . . .

As can be seen, because of apparent memory capacity and audio quality limitations, the above review is very unfavorable in spite of the player's high transaction volume. Thus, for consumers who are music enthusiasts, this particular player might not be a good choice. But for those who are primarily game enthusiasts, it may be a great add-on player for their handheld videogame devices. Unfortunately, the review and overall customer rating disproportionately reflects the unfavorable (to some) aspects of the device. Such disproportionately unfavorable information may depress future transactions for the item by dissuading those who might have been perfectly satisfied with the device from making the transaction.

The prevalence of disproportionately unfavorable ratings and reviews results from the fact that consumers who are dissatisfied with an item are more likely to go to the trouble of submitting an unfavorable rating or written review than consumers who are satisfied. Because the presentation and display of the disproportionately unfavorable ratings and reviews lacks context, i.e., because the ratings and reviews are not counterbalanced by the presentation and display of more objective and/or favorable information about the item, a prospective customer may be unnecessarily dissuaded from making a transaction.

In some cases, the problem is not the prevalence of disproportionately unfavorable ratings and written reviews, or the lack of context, but rather the lack of a rating and/or reviews. For example, many items available for purchase online will receive no ratings or reviews, such as items that are used or items that are in certain categories that are less likely to be rated or reviewed. An online merchant must often proactively encourage customers and visitors to their Web page to post ratings and/or reviews in order to get a meaningful rate of response, i.e., a sufficient number of ratings and/or reviews to provide prospective customers with meaningful information. Such encouragement can itself be perceived by a potential customer as unnecessary posturing and adversely affect sales or goodwill.

Figure 3:
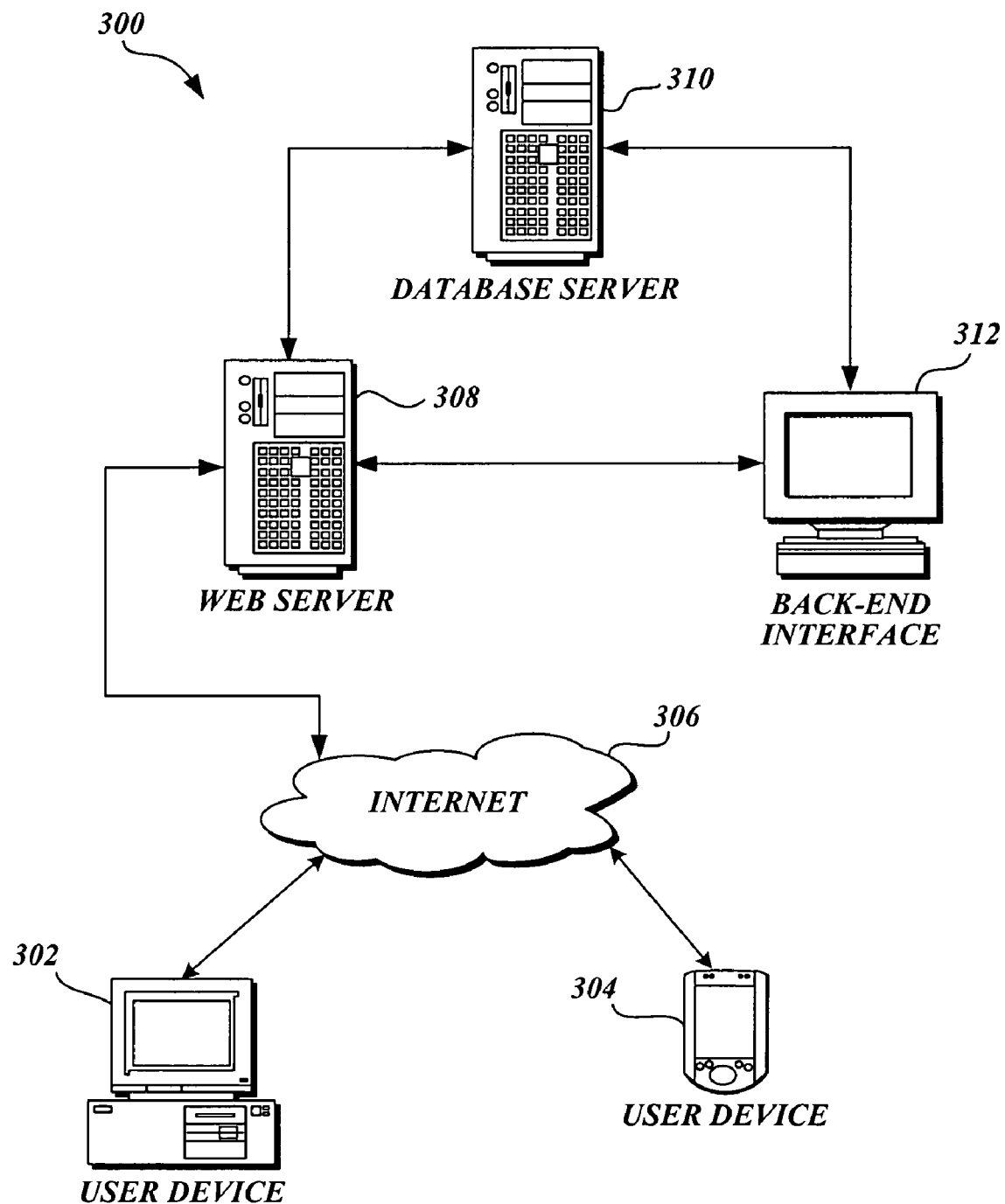
FIG. 3 is a diagram illustrating an environment for implementing one embodiment of the invention.

An environment in which an embodiment of the present invention may be implemented is typically an online system in which a prospective customer may obtain information about items offered for sale, lease, or rental, and transactions for those items. FIG. 3 illustrates one such environment for implementing an embodiment of the present invention. In the illustrated example, an online merchant system 300 maintains objective transaction data and subjective consumer rating and review data that can be used to infer a satisfaction index for a particular item, or for a particular feature of the item. The index may be presented to prospective customers as an aid to decide whether to initiate a transaction for an item. In the description that follows, references to the online merchant system 300 is for ease of illustration only. It is understood that other types of systems, such as systems for leasing or renting products, or systems for services are also contemplated as the type of system in which the present invention may be implemented. Accordingly, references to the online merchant system 300 are only illustrative and do not serve to limit the general application of the invention to other types of systems.

Continuing with FIG. 3, the environment also includes various consumer electronic user devices, illustrated here by way of example as a computer system 302 and a PDA 304, which individual users can use to communicate with the online merchant system 300. In the environment shown in FIG. 3, the user devices 302, 304 communicate with the online merchant system 300 via one or more computer networks, such as the Internet 306. Protocols and components for communicating via the Internet are well known to those of ordinary skill in the art of computer network communications. Communication between user devices 302, 304 and the online merchant system 300 may also be enabled by local wired or wireless computer network connections.

The online merchant system 300 depicted in FIG. 3 operates in a distributed computing environment including several computer systems that are interconnected via communication links, e.g., using one or more computer networks or direct connections. However, it will be appreciated by those of ordinary skill in the art that the system 300 could equally operate in a computer system having fewer or greater numbers of components than are illustrated in FIG. 3. Thus, the depiction of the online merchant system 300 in FIG. 3 should be taken as exemplary, and not limiting to the scope of the claims that follow.

The online merchant system 300, as illustrated, includes a Web server 308, a database server 310, and a back-end interface 312. Each of the servers 308 and 310 is described below in more detail. The back-end interface 312 allows an operator of the online merchant system 300 to monitor and adjust the operation of the servers 308 and 310, as needed.

In brief, the Web server 308 is generally responsible for providing front-end user communication with various user devices, such as devices 302 and 304, and back-end online merchant services in cooperation with the database server 310. The front-end communication provided by the Web server 308 might include generating text and/or graphics, possibly organized as a Web page using hypertext transfer protocols, in response to information and requests that were received from the various user devices 302, 304. The Web server 308 also is generally responsible for presenting item detail information and consumer satisfaction data obtained or derived from the databases in the database server 310.

The back-end online merchant services that are provided by the Web server 308 might include presenting the detailed item information and consumer review and ratings that are associated with a particular item. The services may further include presenting a satisfaction index inferred from the consumer review and ratings, and/or transaction data associated with the particular item in accordance with an embodiment of the present invention. The database server 310, as described below in reference to FIG. 4, maintains the databases that the Web server 308 uses to respond to requests from prospective customers. Among other data, the databases contain item catalog data, item transaction data, including transaction volume, returns, and refunds, interactive shopping data captured during customer interaction with the Web pages, and item and/or item feature ratings and reviews submitted by consumers or others having experience with the items. Among other uses, the data from the databases is used to estimate consumer satisfaction with an item, where consumer satisfaction is inferred from the data in accordance with an embodiment of the invention.

In one suitable implementation, the online merchant system 300 enables a user to view product detail information obtained from an online catalog of items stored in the databases in the database server 310. The items may include any type of product or service that can be purchased, rented, leased or otherwise acquired online, including (but not limited to) books, consumer electronics, video and audio media, toys and games, baby gear, apparel and accessories, etc. Selection of an item to view using the online merchant system 300 can be accomplished in a variety of ways. For example, a user may manually select an item from an online catalog in a manner that favorably identifies the item that the user desires to view using the online merchant system 300. Automated selection of items to view based on user actions may also be provided. For example, each time the user selects a particular item for a potential transaction, similar items in the same category may automatically be displayed using the online merchant system 300.

Once selected, images of and detailed information about the selected item are delivered by the Web server 308 to the user device 302, 304 for display to the user, e.g., in the form of a Web page, a portable document image, a raster-based image, a vector-based image, etc. Images of items may be stored and delivered in any available image format, including but not limited to .html, .jpg, .gif, .pdf, and/or .tif formats. The detailed information typically includes at least one consumer rating or review. The rating or review is displayed to the user in conjunction with the information obtained from the online catalog.

As will be discussed below, the detailed information may further include an index generated for the selected item and delivered by the Web server 308 to the user device 302, 304 for display to a prospective customer. The index is typically displayed near the other item detail information, including the consumer ratings and/or reviews of the item. The display of the index places the consumer ratings and/or reviews of the item in context with the data upon which the index is based, e.g., the total sales transaction volume. The index functions as an alternative estimation of consumer satisfaction with an item, and may be used as an aid to determining whether to purchase a particular item. The generation and presentation of the index in an online merchant system 300 is described in more detail below.

Figure 4:
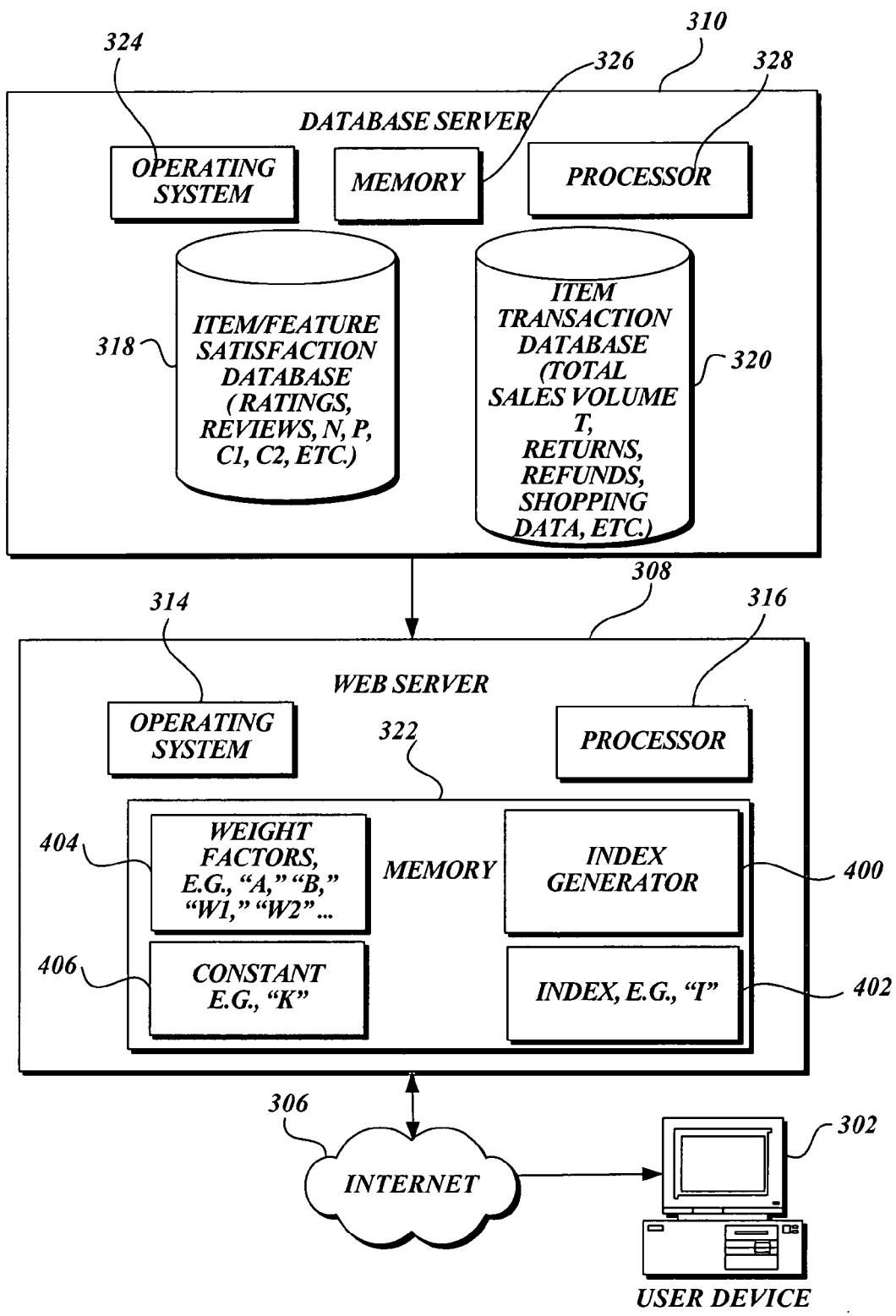
FIG. 4 is a block diagram depicting an arrangement of certain computing components for implementing the embodiment shown in FIG. 3.

FIG. 4 illustrates in further detail exemplary database server 310 and Web server 308 computing components that are responsible for the operation of the online merchant system 300 shown in FIG. 3. The Web server 308, for example, is shown as including an operating system 314, processor 316, and memory 322. An index generator process 400, stored in the memory 322, includes executable program instructions that operate in cooperation with the Web server 308, database server 310, the Internet 306, and user devices 302, 304, to generate an index 402 for an item whenever the Web server 308 responds to users' requests to view detailed information about the item. The index generator 400 is described in more detail below. Suitable implementations for the operating system 314, processor 316, and memory 322 are known or commercially available, and are readily implemented by persons having ordinary skill in the art, particularly in light of the disclosure herein.

Figure 5:
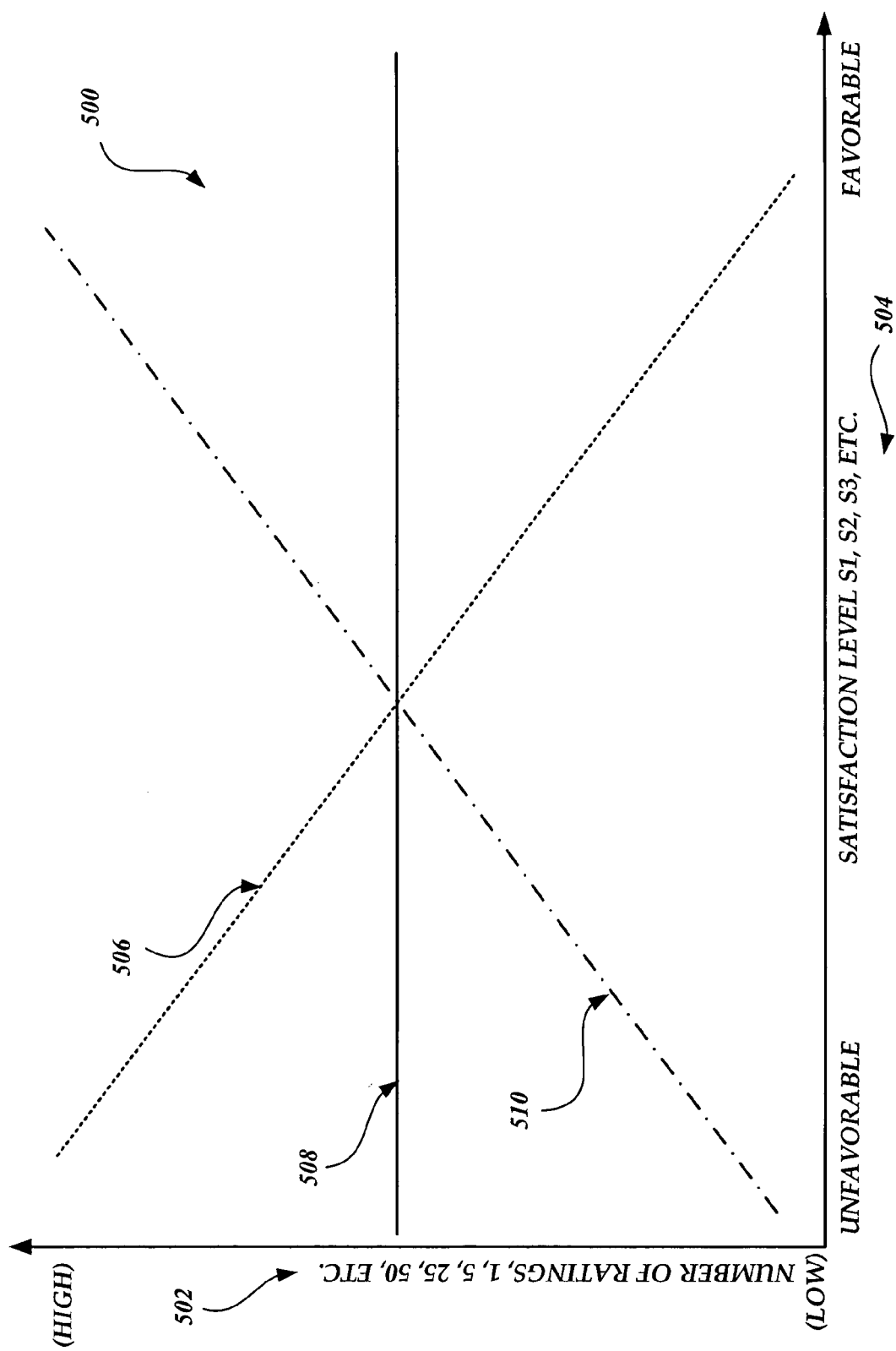
FIG. 5 is a chart that illustrates comparative numbers of ratings and/or reviews by satisfaction level that a given item might receive.

In one embodiment, the database server 310, as illustrated in FIG. 4, includes an item/feature satisfaction database 318 for storing subjective satisfaction data in the form of ratings or reviews about items, including ratings and reviews submitted by customers that purchased the items, or others having experience with the items. FIG. 5 shows a chart 500 that illustrates a comparison of the types and numbers of ratings 502 that a given item might receive and that would be stored on the item/feature satisfaction database 318. For example, the ratings may include ratings on a scale of multiple satisfaction levels 504, such as the illustrated levels S1, S2, S3, etc. As shown, S1 represents a lower level of satisfaction, and may thus be classified as unfavorable, and S3 represents a higher level of satisfaction with an item, and may thus be classified as favorable. The dashed line 506 illustrates an example of an item that has received a high number of unfavorable ratings, whereas the dashed and dotted line 510 illustrates an example of an item that has received a high number of favorable ratings. The solid line 508 illustrates an example of an item that has received equal numbers of favorable and unfavorable ratings. Of course, most items will probably fall somewhere in between the examples represented by lines 506, 508, and 510.

Returning now to FIG. 4, the reviews contained in the item satisfaction database 318 include written reviews that were submitted by customers or other consumers to the online merchant system 300 after purchasing or using the items. It should be noted that both the ratings and reviews contained in the item satisfaction database 318 may be maintained for the item as a whole, or, in some cases, may be separately maintained for specific features of a particular item. For example, for items in the consumer electronics category, one feature for which satisfaction data may be separately maintained may be the item's audio or video quality.

In one embodiment, the database server 310, as illustrated in FIG. 4, includes an item transaction database 320 for storing objective item transaction data. Among other data, the item transaction data stored on database 320 can include the total volume of sales (rentals, etc.) of an item, and may further include the number of returns, and the number of refunds. In one embodiment, the item transaction data may include interactive shopping data that was captured when the user interacted with the item detail web page generated by the online merchant. Interactive shopping data may include such data as the number of times a prospective customer clicks on the item detail Web page or the amount of time he or she spends browsing the page. The interactive shopping data is typically screened to eliminate fraudulent interactions with the page, such as suspiciously large numbers of clicks originating from a single source.

The database server 310 includes an operating system 324, a memory 326, and a processor 328 configured to receive and respond to user requests to view detailed information about products or services from an online catalog. Suitable implementations for the operating system 324, memory 326, and processor 328 are known or commercially available, and are readily implemented by persons having ordinary skill in the art, particularly in light of the disclosure herein.

The database server 310 operates in cooperation with the Web server 308 to process requests to view detailed information about items as contained in an online catalog. The database server 310 serves information contained in the item feature satisfaction database 318 (based on subjective data) and information contained in the transaction database 320 (based on objective data) to the Web server 308. The Web server 308, in turn, operates in conjunction with the index generator 400 to generate the index 402, and to display the information contained in the catalog as served from the databases 318 and 320, along with the generated index 402 via the Internet 306 on a user device 302, 304.

In operation, the Web server 308 controls the processing of the index generator 400 to compute and present an index 402 for a particular item or items whenever detailed information about the item is displayed to the user. For example, a user may request to view an infant car seat, as was described with reference to FIG. 1. Instead of just presenting the overall customer rating of the item or the written reviews obtained from the item satisfaction database 318, the Web server 308, operating in conjunction with the index generator 400, uses the ratings and objective transaction data to compute the index 402 for the item in question. In one embodiment, the index 402 combines the unfavorable ratings obtained from the item satisfaction database 318 with the total transaction volume of the item as obtained from the item transaction database 320.

In one embodiment, the Web server 308 causes the index generator 400 to extend the computation of the index 402 to combine all of the ratings of the item, both favorable and unfavorable, with the total transaction volume of the item. Alternatively, or in addition, the index generator 400 extends the computation of the index 402 to combine the total number of returns of the item and/or refunds issued for the item with the total transaction volume of the item.

In one embodiment, the index generator 400 obtains a weight factor 404 stored in memory 322 to modify the index 402 by weighting the ratings obtained from the item satisfaction database 318 prior to combining them with the total transaction volume. Weighting the ratings may be accomplished by multiplying the rating by the weight factor 404. The value of the weight factor may vary from one item to the next, and is typically a numeric value that may be favorable or unfavorable. In one embodiment, one weight factor may be applied to one classification of ratings, while another weight factor may be applied to another classification of ratings. For example, one weight factor, A, may be applied to the number of unfavorable ratings that an item receives, while another weight factor, B, may be applied to the number of favorable ratings that the item receives. In this manner, ratings may be normalized from one item to the next to provide consistency. In one embodiment, a different weight factor may be applied to each different rating, e.g., weight factor W1 to the number of ratings indicating a satisfaction level of S1, weight factor W2 to the number of ratings indicating a satisfaction level of S2, and so forth.

In one embodiment, the weight factors may be derived using standard curve-fitting techniques. For example, from time to time the index generator 400 may expressly query a large set of customers as to whether they are satisfied with a particular item. By mapping their expected responses to their actual responses, the index generator 400 can use any variance between the expected and actual response to tune the weight factors. Repeated tuning will eventually result in converging to a nearly optimum set of weight factors.

In one embodiment, the total number of returns and/or refunds may be weighted prior to combining them with the satisfaction data and total transaction volume in a manner similar to the weighting of ratings described above. For example, returns of an item may be weighted more heavily than refunds since a customer that goes to the trouble of returning an item is likely to be more dissatisfied than one who simply receives a refund. Also, when both returns and refunds are used to generate the index, one may be accorded less weight to account for the fact that purchases of items that are returned are also likely to have been refunded.

In one embodiment, the index 402 is further modified by applying a constant 406 chosen to prevent, or at least deter, a competitor from extrapolating sensitive transaction data on which the index is based.

Those of ordinary skill in the art will recognize that the Web server 308 and database server 310 will typically employ a memory 322, 326, and processor 316, 328, in which program instructions are stored and executed for operation of the servers, 308, 310. The Web server 308 and database server 310 further include executable program instructions for maintaining and updating the databases 318, and 320, and responding to user requests to view detailed information and generating the indices 402. Some of the executable program instructions may be embodied in the index generator 400, shown in the illustrated embodiment as residing on the Web server 308. Alternatively, the executable program instructions, including instructions having the index generator 400 may be embodied in multiple processes that reside in multiple servers, including both the Web server 308 and database server 310, or even on the user devices 302, 304.

For the sake of convenience, much of the description herein is provided in the context of generating and presenting an index for an item. However, it should be understood that the description herein is also applicable to generating and presenting an index 402 for a feature of an item, as long as the item satisfaction data is maintained in the item satisfaction database 318 for the item feature in question. Alternatively, or in addition, it is further understood that the description herein is also applicable to generating and presenting an index 402 for a service, or a feature of a service. In addition, references herein to specific types of products (or services), such as baby gear, consumer electronics, music, etc., are only illustrative and do not serve to limit the general application of the invention to other types of products (or services).

Figure 6A:
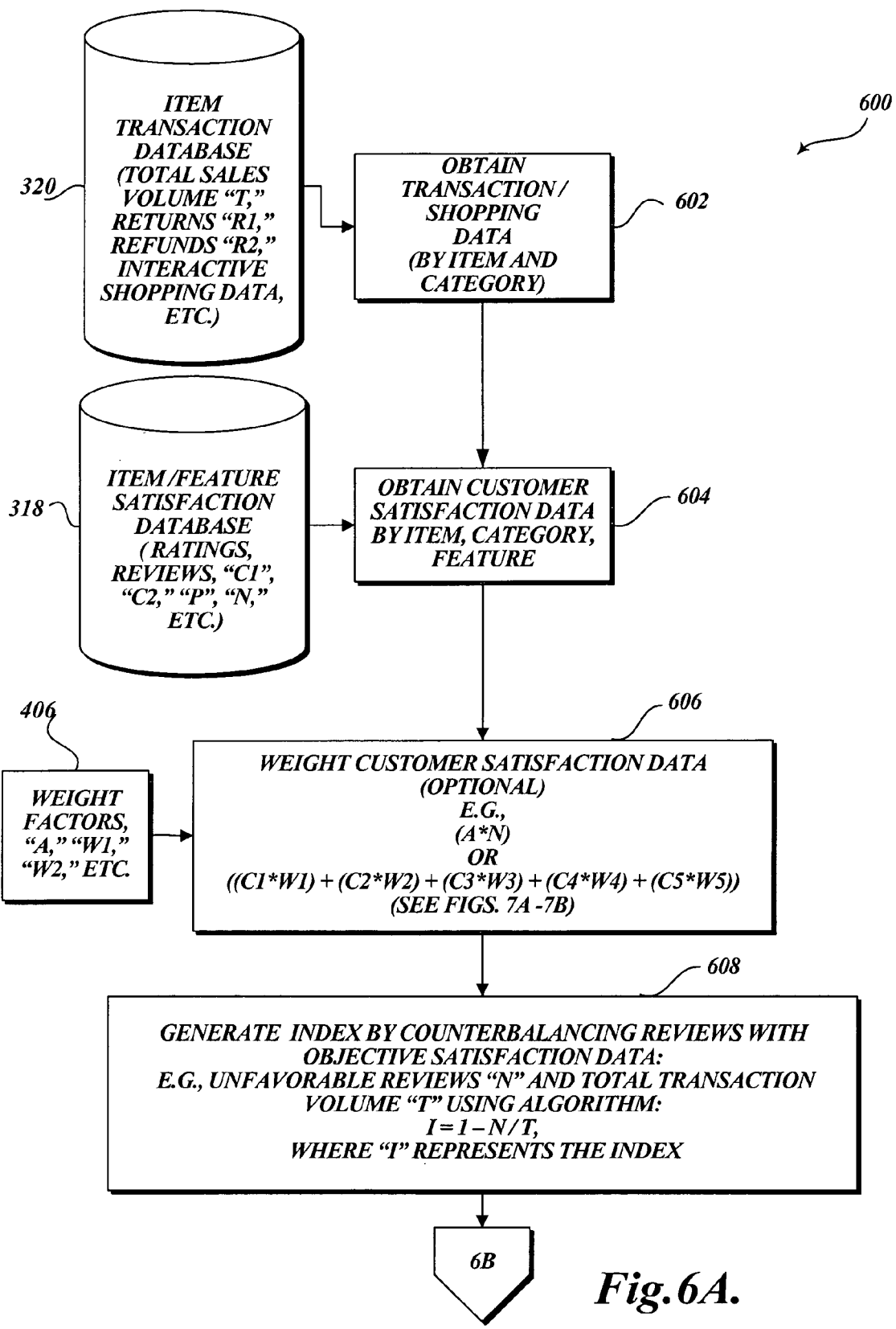
FIGS. 6A-6B are flow diagrams describing one embodiment of a process for estimating consumer satisfaction using an index.
Figure 6B:
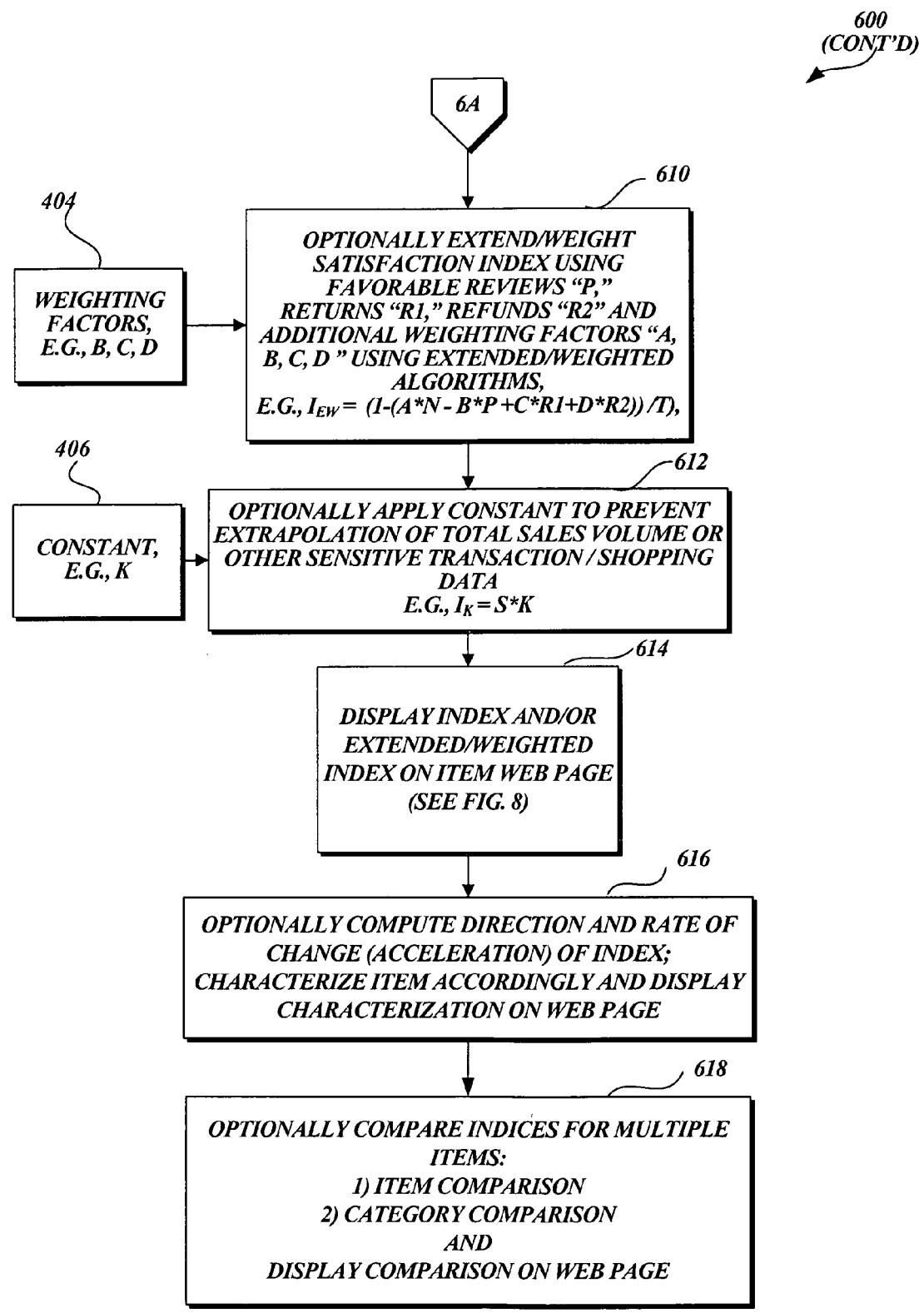

FIGS. 6A-6B together provide a flow diagram describing one embodiment of a process for measuring consumer satisfaction using an index 402. The process may be represented by the index generator 400, as shown in FIG. 4, and implemented in the Web server 308 and database server 310 as part of an online merchant system 300, as shown in FIGS. 3 and 4.

In operation, each time a prospective customer requests detailed information about an item from an online catalog in the online merchant system 300, the Web server 308, at process block 602, obtains transaction data from the item transaction database 320. In one embodiment, the item transaction data obtained from the item transaction database 320 includes the total transaction volume, "T." In one embodiment, the item transaction data obtained from the item transaction database 320 includes the total number of returns "R1," and/or the total number or amount of refunds, "R2," for the item. In one embodiment, the item transaction data obtained from the item transaction database 320 includes the interactive shopping data associated with the item, e.g., the number of click-through interactions captured for the item.

Continuing at process block 604, the Web server 308 obtains the customer satisfaction data for the item from the item/feature satisfaction database 318. In one embodiment, the customer satisfaction data obtained from the item satisfaction database 318 includes the total number of unfavorable ratings, "N." In one embodiment, the customer satisfaction data obtained from the item satisfaction database 318 further includes the total number of favorable ratings, "P," or possibly, the total number of ratings at a particular satisfaction level, e.g., the total number of ratings at the lowest satisfaction level, "C1," the total number of ratings at the next lowest satisfaction level, "C2," and so forth. In one embodiment, the customer satisfaction data obtained from the item satisfaction database 318 includes the total number of ratings for a particular feature of the item.

Continuing at process block 606, the Web server 308 causes the index generator 400 to optionally weight the customer satisfaction data obtained at process block 604 prior to using the data in the computation of the index 402. For example, at process block 606, the total number of unfavorable ratings, "N," may be multiplied by the weight factor "A," 404. In one embodiment, there may be multiple weight factors associated with multiple ratings at different satisfaction levels. For example, with reference to FIG. 7A, a chart of satisfaction levels and weight factors illustrates that an item may be rated on a scale of one to five levels of satisfaction 702, such as S1, S2, S3, S4, and S5. Each level may be associated with a different weight factor 704, such as W1, W2, W3, W4, and W5. With reference to FIG. 7B, an example of the types of weight factors 704 that may be associated with the different levels of satisfaction 702 is shown in the chart. As shown, the lowest satisfaction level 702A, here indicated with one icon, is associated with a weight factor 704A having a value of −3. The next lowest satisfaction level 702B, here indicated with two icons, is associated with a weight factor 704B having a value of −1, and so forth. Returning to process block 606 in FIG. 6A, using the example weight factors 704 in FIG. 7B, the total number of ratings at the lowest satisfaction level, "C1," may be multiplied by −3, and the total number of ratings at the next lowest satisfaction level, "C2," may be multiplied by −1, and so forth.

In one embodiment, when more than one type of customer satisfaction data has been obtained, e.g., when both unfavorable and favorable ratings have been obtained, or when multiple ratings at different satisfaction levels have been obtained, the Web server 308 causes the index generator 400 to add the data together after applying the weight factors to obtain an overall value for the customer satisfaction data. The overall value can then be used in the computation of the index 402 as described at process block 608 below.

Continuing at process block 608, the Web server 308 causes the index generator 400 to compute the index 402 using an algorithm that subtracts the overall value of the customer satisfaction data, e.g. the weighted total number of unfavorable ratings, "A*N," from the value of one. The result is divided by the total transaction volume, "T," as obtained at process block 602, to yield an index "I," where "I" represents the index 402, as shown in the equation:

$$I=(1-N)/T$$

Processing continues at process block 610 in FIG. 6B, where the Web server 308 optionally extends the index 402 by using not just the total number of unfavorable ratings "N," but also the total number of favorable ratings "P." Similarly, the Web server 308 optionally extends the index 402 by using one or more of the total number of returns, "R1," and/or the total number or amount of refunds, "R2," for the item. For example, the resulting index "I," may be computed as shown in the equation:

$$I=(1-(A*N-B*P+C*R1+D*R2))/T,$$

where "A" is the weight factor for the unfavorable ratings, "N," and "B" is the weight factor for the favorable ratings, "P," and "C" is the weight factor for the total number of returns, "R1," and "D" is the weight factor for the total number of refunds, "R2."

Processing continues at process block 612, where the Web server 308 optionally applies a security constant "K" 406 to the index "I" to prevent extrapolation of sensitive transaction data, such as the total transaction volume "T." In one embodiment, the constant is applied by multiplying the computed index "I" by the security constant "K" 406 as shown in the equation:

$$I_K=I*K$$

where $I_K$ represents the modified index.

Processing continues at process block 612, where the Web server 308 displays the index "I," (or the extended and/or weighted index, as the case may be) on an item detail Web page that the Web server 308 has generated to display the item to a prospective customer using the online merchant system 300.

Figure 8A:
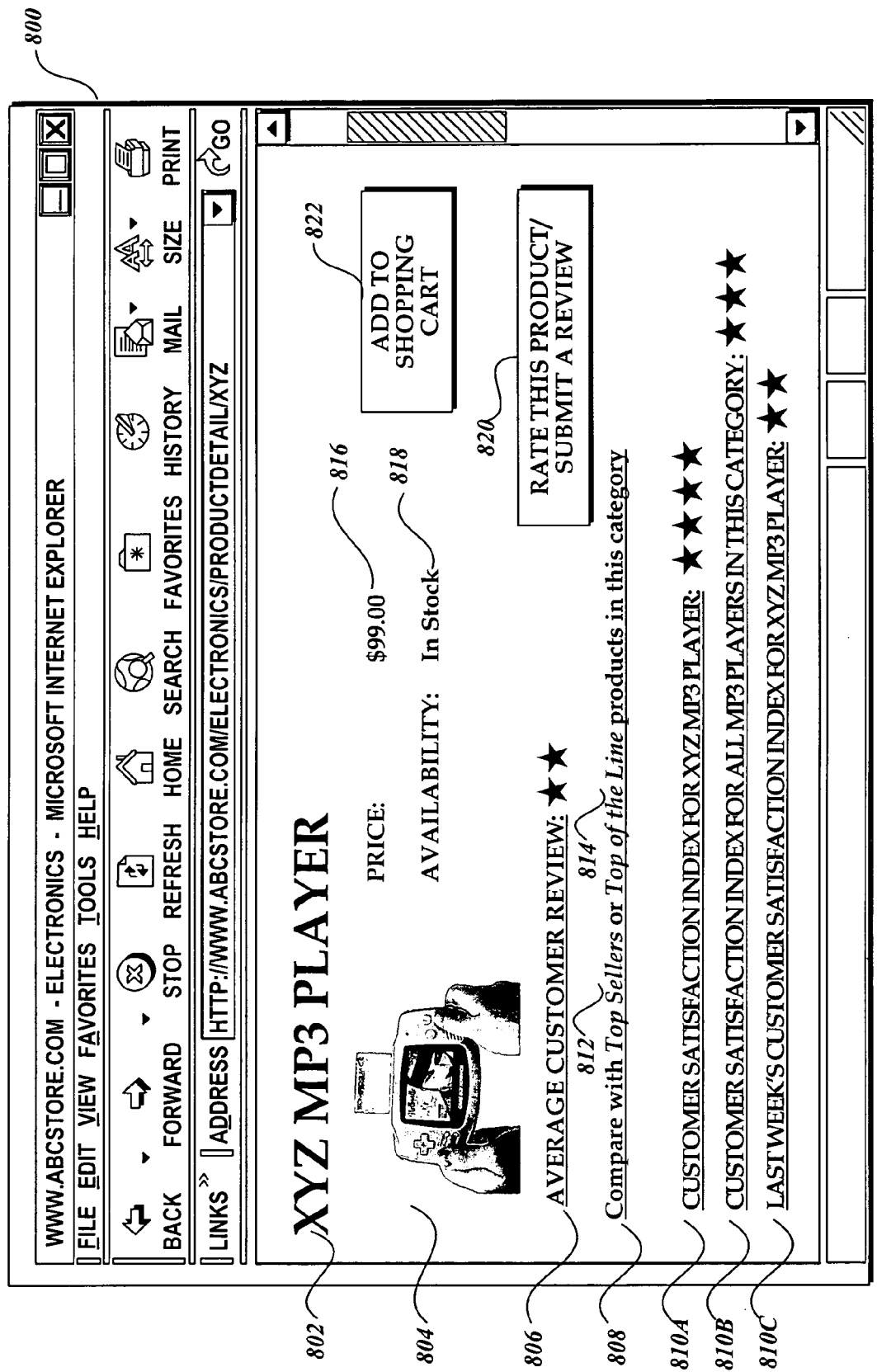
FIGS. 8A-8B depict a browser program with example Web pages formed in accordance with an embodiment of the invention and in which an index is displayed to a prospective customer.

FIG. 8A depicts a browser program 800 with an example item detail Web page formed in accordance with an embodiment of the invention illustrating the presentation of the index "I," (or the extended and/or weighted index, as the case may be) as might be displayed to a prospective customer as described above at process block 612 of FIG. 6. In FIG. 8A, a browser program 800 displays a Web page in which the online merchant, "ABCSTORE" has listed details about an item, an MP3 player, available for purchase online as part of their consumer electronic offerings. As in the example described in FIG. 2, the item details listed in the Web page include the name of the item, "XYZ MP3 PLAYER" at reference numeral 802, a picture of the item at reference numeral 804, the price of the item, "$99.00" at reference numeral 816, and the availability of the item, "In Stock" at reference numeral 818. The Web page further includes a command button labeled "RATE THIS PRODUCT/WRITE A REVIEW," at reference numeral 820 to allow consumers to submit their rating and/or review of the item. The Web page further includes a command button labeled "ADD TO SHOPPING CART" at reference numeral 822, which the consumer may activate to initiate a transaction, as well as hyperlinked text at reference numeral 808 to comparison information for other items in the same category.

As in FIG. 2, for purposes of illustration, suppose that the "XYZ MP3 PLAYER" product illustrated in FIG. 8A has a very high transaction volume (which will be indicated by total revenue or number of transactions), which would indicate that it is very satisfactory to a great deal of consumers. For example, it may well be that it is the only player on the market that allows users to both listen to digital music and view high resolution content, such as album covers, lyrics, and read-along text, displayed on their handheld videogame device screen. Nevertheless, as is shown in FIG. 8A, the overall customer rating at reference numeral 806 appears as only two icons, here shown as stars, indicating that consumers are, on average, only partly satisfied with the "XYZ MP3 PLAYER." As before, because of apparent memory capacity and audio quality limitations, the overall customer rating is unfavorable in spite of the player's high transaction volume. However, because of the high total transaction volume of the player, the index "I," is displayed at reference numeral 810A using a representation of four icons, here shown as star icons, indicating that consumers actually appear to be quite satisfied with the "XYZ MP3 PLAYER." In this manner, the display of the index "I," 810A counterbalances the more unfavorable overall customer rating 806, allowing the prospective customer to make a more informed decision about whether to purchase the "XYZ MP3 PLAYER." It should be noted that the manner of representing the index "I," 810A on the Web page illustrated in FIGS. 8A and 8B using a number of icons is for purposes of illustration only. Other means for representing the index "I," 810A using graphics including other types of icons may be employed. For example, in one embodiment, the actual value of the index (or the value of the weighted and/or extended index, as the case may be) may be displayed instead of icons.

Returning now to process 616 in FIG. 6B, in one embodiment the Web server 308 optionally computes the rate of change of the index 402. Specifically, the Web server 308 compares the value of the index with the value of the index at one or more earlier points in time, e.g., last week, or last month. As shown in the embodiment of the invention illustrated in FIG. 8A, the prospective customer is able to view the change in the index, as the Web server 308 displays the value of the index 402 as computed last week at reference numeral 810B. In this manner, prospective customers may determine at a glance whether this particular MP3 player is increasing or decreasing in popularity. Alternatively, or in addition, the Web server 308 provides the user with a display that indicates the direction and rate of change in the index, as shown in further detail in the embodiment of the invention illustrated in FIG. 8B, as will be described below.

Returning now to process 618 in FIG. 6B, in one embodiment, the Web server 308 optionally compares an index for one item to the index for another item. Alternatively, or in addition, Web server 308 optionally compares an index for one item to that of the category of items to which the item under consideration belongs, referred to herein as a category comparison. Among other benefits, the item comparison provides prospective customers with additional information with which to decide to purchase one item over another. Similarly, the category comparison provides prospective customers with information about whether they would likely be more satisfied with a different item within the same category as the item under consideration.

Returning now to FIG. 6B, at process block 618, when performing the process for the category comparison, the Web server 308 computes an index 402 for the category of the item under consideration. The computation of the index uses customer satisfaction data for each item in the same category or, in some cases, uses data that has already been aggregated across all items in the category. The Web server 308 further divides the index for the item under consideration by the index for all items in the same category, as illustrated in the following equation:

$$I_P/I_C = \text{Comparison}$$

$I_P$ represents the index for the item (the product or service) under consideration, and $I_C$ represents the index for the category.

As noted previously, the resulting fraction $I_P/I_C$ is a number that is greater than, less than, or equal to the value of 1. When greater than 1, the category comparison indicates that consumer satisfaction with the particular item is greater than consumer satisfaction with items in that category in general. When equal to 1, the category comparison indicates that consumer satisfaction with the particular item is the same as consumer satisfaction with items in that category in general. When less than 1, the category comparison indicates that consumer satisfaction with the particular item is less than consumer satisfaction with items in the category in general. Among other uses, the category comparison may be advantageously used to provide the prospective customer with information indicating that he or she may be happier with a different model or make of an item in a particular category. Similar to the item comparison of indices, the category comparison of indices may also be used to rank items within the category.

With reference to the example Web page illustrated in FIG. 8A, the item or category comparisons may optionally be displayed when the prospective customer activates the link to compare the item with other items at reference numeral 808, captioned "Compare with top Sellers or Top of the line products in this category," or the link to display the customer satisfaction index for all items in this category at reference numeral 810B. In one embodiment, when displaying the item comparison, the compared items may be ranked according to the values of their respective indices.

Figure 8B:
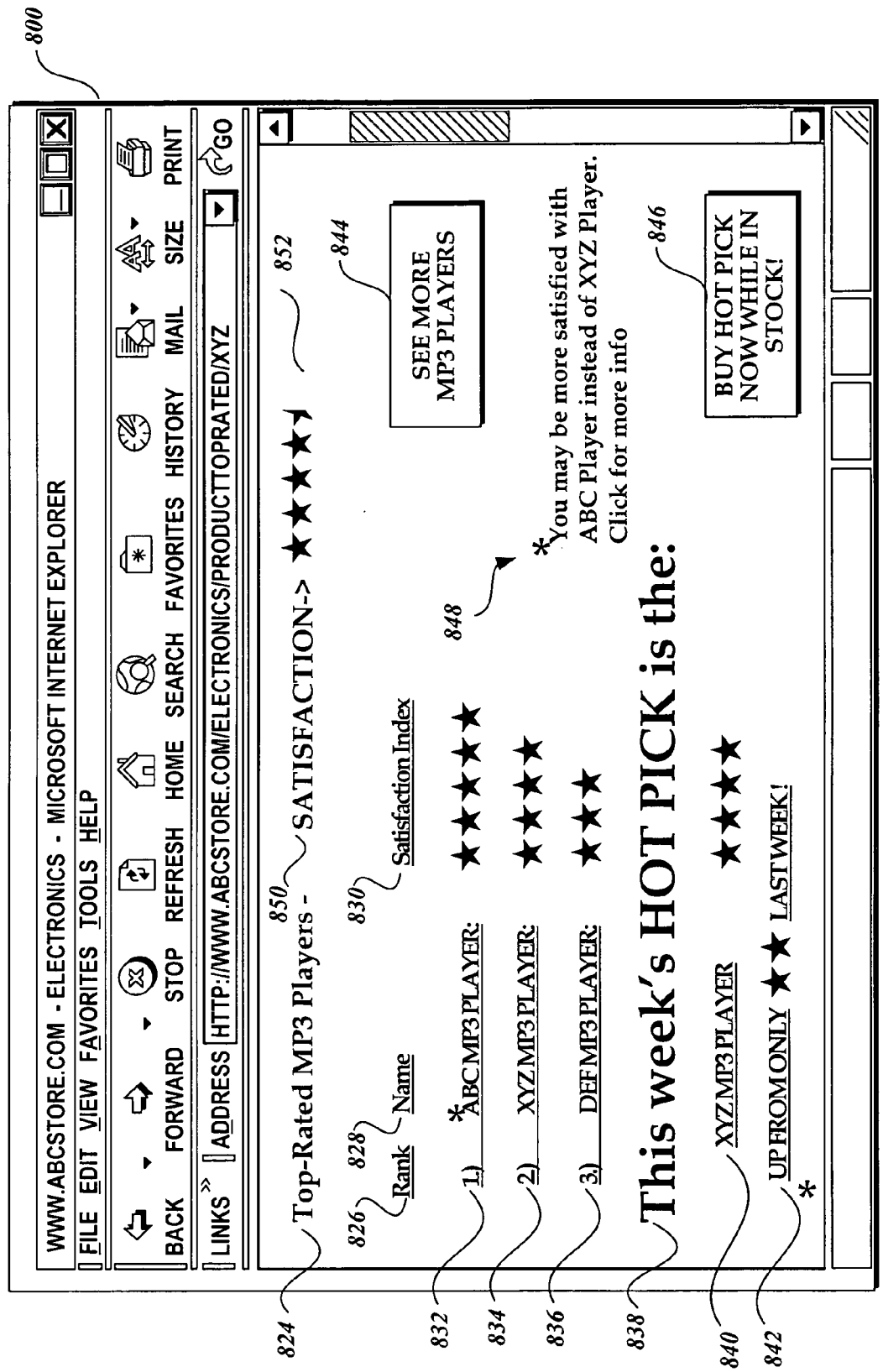

With reference to FIG. 8B, the browser program 800 further displays a Web page in which the Web server 308, operating for the online merchant, "ABCSTORE," has listed top-rated items in a particular category, here the MP3 Player category. The Web page includes a title having text that indicates that the top-rated items are listed on the page, in this case the text "Top-Rated MP3 Players" at reference numeral 824. The Web page further includes a display of the current index for the item category of MP3 Players, labeled "SATISFACTION," at reference numeral 850, and followed by the display of a representation of the index for the MP3 Player category at reference numeral 852 as 4½ icons, here shown as 4½ stars. The information to be displayed about the top-rated items includes a rank of the item in a column labeled "Rank" at reference numeral 826, a name of the item in a column labeled "Name" at reference numeral 828, and the top-rated items' indices in a column labeled "Satisfaction Index" at reference numeral 830. In the illustrated example, three products are displayed, including the "ABC MP3 PLAYER," ranked number 1 with a 5-star representation of the index at reference numeral 832, the item currently under consideration, namely the "XYZ MP3 PLAYER," ranked number 2 with a 4-star representation of the index at reference numeral 834, and the "DEF MP3 PLAYER," ranked number 3 with a 3-star representation of the index at reference numeral 836.

In the illustrated example, with only 4 stars as compared to the current index for the MP3 Player category of 4½ stars, as shown in reference numeral 852, the category comparison for the "XYZ MP3 Player," results in a value for the $I_P/I_C$ that is less than 1. This indicates that consumer satisfaction with the "XYZ MP3 Player," is less than consumer satisfaction with products in the MP3 Player category in general. Therefore, the customer may want to consider whether they may be more satisfied with a higher rated player. For example, the customer may want to consider purchasing the "ABC MP3 Player" instead based on its higher index value represented as 5 stars. The customer is notified of the suggestion by the display of a flag near the recommended item, in this case a display of an asterisk, "*" next to the "ABC MP3 Player." Also included in the display is explanatory text, in this case the hyperlinked text "You may be more satisfied with ABC Player instead of XYZ Player. Click for more info," at reference numeral 848.

Continuing with the example depicted in FIG. 8B, listed below the display of the top-rated players is the display of the player characterized as the current "Hot Pick" at reference numeral 838. In the illustrated example, the "Hot Pick" of the week is the "XYZ MP3 PLAYER," as shown at reference numeral 840. Even though, the XYZ player is ranked second, the Web server 308 determined that the index for the "XYZ MP3 PLAYER" was changing faster so as to indicate consumer satisfaction than the index for any other item in that category. For example, last week the XYZ MP3 PLAYER had only a 2-star representation of the index, as is shown at reference numeral 842, and this week has a 4-star representation of the index; double the value of the previous week's index.

Continuing with the example depicted in FIG. 8B, the Web server 308 also provides the prospective customer with a command button labeled "SEE MORE MP3 Players,", at reference numeral 844, which the prospective customer can click to view detailed information about other MP3 Players that may not be shown in FIG. 8B. In addition, the Web server 308 provides a command button at reference numeral 846 labeled "BUY HOT PICK NOW WHILE IN STOCK!," which the prospective customer can click to initiate a transaction of the "XYZ MP3 Player" characterized as the current "Hot Pick."

While selected embodiments of the invention have been illustrated and described above, it will be appreciated that various changes can be made therein without departing from the spirit and scope of the invention. For example, an operator of an online merchant system 300 may wish to employ the invention in a manner that weights the subjective data representing a subjective indication of consumer satisfaction associated with their own customers more heavily than data associated with prospective customers that have not purchased, leased, or rented the item from the operator/merchant. In addition to different weights, the value and application of the constant to prevent, or at least deter, competitors from extrapolating the merchant's sensitive transaction data may vary from one implementation of the invention to the next. In addition, other types of subjective and objective data associated with an item besides the ratings, reviews, revenue, sales, returns, discontinuations, refunds, other transactions, and interactive shopping data, may be used to extend the index without departing from the scope of the claims that follow. Moreover, as noted earlier, while the present invention has primarily been described in the context of the illustrated online merchant system 300 and in the context of products, it may have broader application in the general field of consumer electronic commerce, such as in online leasing or rental systems, and systems that pertain to services, not just products. The scope of the present invention should thus be determined from the following claims and equivalents thereto.

The embodiments of the invention in which an exclusive property or privilege is claimed are defined as follows:

1. A computer-implemented method for estimating consumer satisfaction in a computer-implemented system, the method comprising:

retrieving subjective data representing a subjective indication of at least one consumer's satisfaction with a first item;

retrieving objective data related to the first item that has a first portion representing an objective indication of transaction data associated with transactions with a merchant for the first item and that has a second portion representing interactions by prospective customers with one or more Web pages from the merchant that include information related to the first item, the transactions with the merchant including sales of the first item by the merchant to multiple consumers and the first portion of the retrieved objective data being based at least in part on a quantity of the sales of the first item by the merchant;

automatically determining an index for the first item as a function of both the subjective data and the objective data, the index estimating overall consumer satisfaction with the first item, the automatic determining being performed by one or more programmed computer systems of a merchant;

providing information for display to one or more consumers other than the multiple consumers that includes the determined index for the first item, the providing of the information being performed by the one or more programmed computer systems of the merchant to facilitate a decision by the one or more consumers regarding whether to purchase the first item from the merchant; and in response to the providing of the information about the determined index, receiving instructions from a first of the one or more consumers to purchase the first item, and facilitating the purchase of the first item from the merchant for the first consumer.

2. The method of claim 1, further comprising:

quantifying the subjective data;

quantifying the objective data; and further wherein determining the index as a function of both the subjective data and the objective data includes comparing the quantified subjective data and the quantified objective data to place the subjective indication of the at least one consumer's satisfaction with the first item into context with the objective indication of transaction data.

3. The method of claim 1, wherein the subjective data includes, for each of the at least one consumers, an evaluation of the consumer's satisfaction with the first item that is based on at least one of a rating of the first item by the consumer and a review of the first item by the consumer.

4. The method of claim 3, wherein possible values for the evaluations range from dissatisfied to satisfied.

5. The method of claim 3, wherein each of the evaluations indicates one of a plurality of consumer satisfaction levels.

6. The method of claim 2, wherein the quantifying of the subjective data includes totaling at least one of a number of consumer evaluations that indicate dissatisfaction with the first item and of a number of consumer evaluations that indicate satisfaction with the first item.

7. The method of claim 3, wherein one or more of the transactions for the first item each include at least one of a return, lease, termination of lease, rental, termination of rental, and refund for the first item.

8. The method of claim 1 wherein the first portion of the retrieved objective data that is based at least in part on the quantity of the sales of the first item corresponds to at least one of a volume of the sales of the first item to the multiple consumers and a rate of the sales of the first item to the multiple consumers, and wherein the second portion of the retrieved objective data includes information about at least one of a quantity of views of the one or more Web pages by the prospective customers and of a quantity of click selections by the prospective customers of information relating to the first item on the one or more Web pages.

9. The method of claim 2, further comprising weighting the quantified subjective data with a weight factor prior to determining the index as a function of both the subjective data and the objective data.

10. The method of claim 9, wherein the weighting of the quantified subjective data is optimized based on curve-fitting, the curve-fitting including:
    querying a plurality of consumers as to whether they are satisfied with the first item; and
    determining a variance between expected responses to the querying and actual responses to the querying.

11. The method of claim 9, wherein the weight factor includes at least one of a dissatisfaction, satisfaction, return, and refund weight factor.

12. The method of claim 1 wherein the providing of the information that includes the determined index for the first item includes providing a page for display that includes the determined index positioned next to the subjective indication of the at least one consumer's satisfaction with the first item.

13. The method of claim 1 wherein the providing of the information that includes the determined index for the first item includes providing a page for display that includes a second index estimating overall consumer satisfaction for a second item, the second index being determined as a function of subjective data and objective transaction data for the second item.

14. The method of claim 13, further comprising ranking the first item relative to the second item based on the determined index for the first item and on the determined second index for the second item.

15. The method of claim 14 wherein the page provided for display further includes information for the first and second items that is arranged in an order reflecting the ranking of the first and second items.

16. The method of claim 1 wherein the providing of the information that includes the determined index for the first item includes providing a page for display that includes an index estimating overall consumer satisfaction for a category to which the first item belongs.

17. The method of claim 16 wherein the page provided for display further includes an indication of whether consumers are more, less, or equally satisfied with other items in the category based on comparing the determined index for the first item to the index for the category.

18. The method of claim 1 further comprising determining a change in the index for the first item over time, and wherein the providing of the information that includes the determined index for the first item includes providing a page for display that includes an indication of the determined change in the index.

19. A system for a merchant to facilitate an estimation of consumer satisfaction, the system comprising:
    a first repository of subjective satisfaction data representing at least one rating of an item by a consumer;
    a second repository of objective transaction data related to the item that has a first portion representing transactions with the merchant associated with the item and that has a second portion representing interactions by prospective customers with one or more pages from the merchant that include information related to the item, the transactions with the merchant including sales of the item by the merchant to multiple consumers and the first portion of the objective transaction data being based at least in part on a quantity of the sales of the item by the merchant; and
    a processor configured to:
        generate for the merchant an index of estimated overall customer satisfaction for the item as a function of the subjective satisfaction data and the objective transaction data, the generating of the index including weighting the subjective satisfaction data and the objective transaction data in distinct manners; and
        provide information from the merchant to consumers about the generated index to facilitate purchasing decisions by the consumers regarding purchasing the item from the merchant.

20. The system of claim 19, wherein the index has a value spanning a range of degrees of consumer satisfaction and dissatisfaction.

21. The system of claim 20, wherein each of the at least one transactions is for one of a sale, return, refund, lease and rental of the item.

22. The system of claim 19, wherein the processor is further configured to quantify at least one of the subjective satisfaction data and the objective transaction data.

23. The system of claim 19 wherein the second portion of the retrieved objective data includes information about at least one of a quantity of views of the one or more pages by the prospective customers and of a quantity of click selections by the prospective customers of information relating to the item on the one or more pages.

* * * * *